July 20, 1965 P. KORNREICH 3,196,342
CURRENT REGULATING CIRCUIT
Filed March 24, 1961
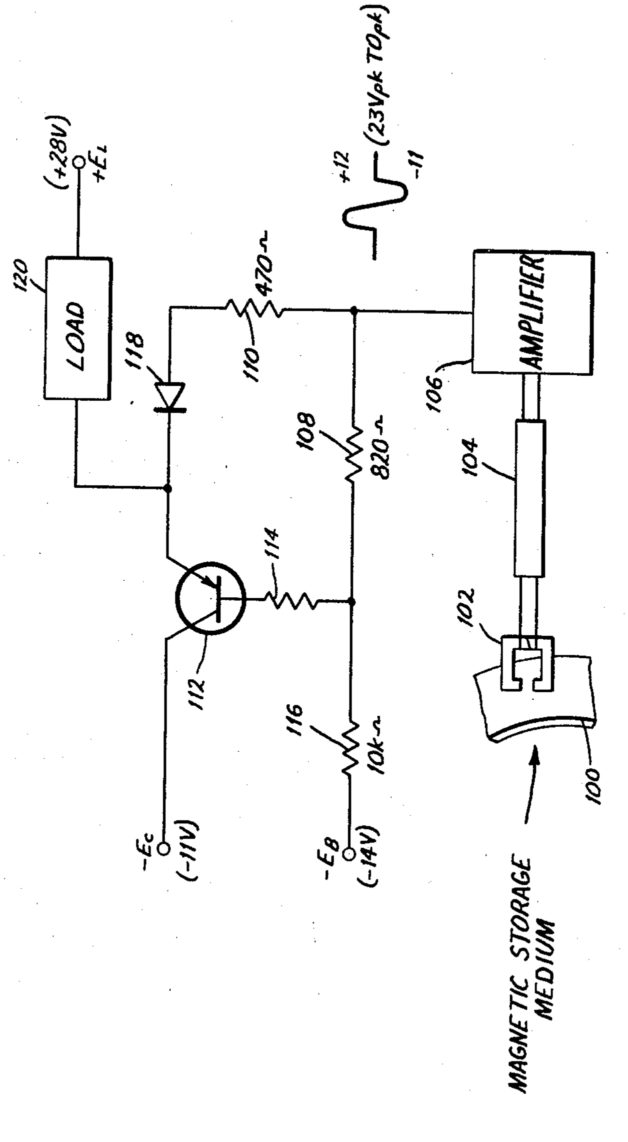
INVENTOR.
PHILIPP KORNREICH
BY
J. Donald Weber, Jr.
AGENT United States Patent Office 3,196,342
Patented July 20, 1965

3,196,342
CURRENT REGULATING CIRCUIT

Philipp Kornreich, Pennsauken, N.J., assignor to Sperry Rand Corporation, New York, N.Y., a corporation of Delaware Filed Mar. 24, 1961, Ser. No. 98,060
6 Claims. (Cl. 323—4)

This invention relates to a current regulating circuit. In particular, the circuit regulates the amount of current drained from a circuit by a load.

This circuit is used as the output circuit of an amplifying circuit which is connected to a magnetic head which reads magnetic information from a magnetic storage medium for example, a magnetic tape or magnetic drum. The particular type of output circuit is utilized in order to provide a low impedance output from an amplifier circuit.

The magnetic head may read information from the aforesaid magnetic storage medium and provide a signal having an amplitude of approximately 5 millivolts. Clearly, this signal is extremely small. Therefore, the 5 millivolt signal is fed from the magnetic head to an amplifier circuit. In order to provide a low impedance output circuit from the amplifier, the circuit which is the subject of this invention is utilized. The signals supplied by the amplifier will normally be sinusoidal in configuration. Therefore, means must be provided whereby the output circuit is not cutoff when the sinusoidal output signal from the amplifier attains its negative going portion. The means for doing this, is the insertion of a diode in the emitter circuit of the emitter-follower transistor which comprises the output circuit. It may be seen, that this diode will protect the emitter-follower transistor from being cutoff by the negative going portion of the sinusoidal signal produced by the amplifier, but will not interfere with the operation of said transistor when the signal produced by the amplifier is positive going or a steady state D.C. level having a positive magnitude.

Therefore, one object of this invention is to provide a circuit which regulates the current drawn from the base of the transistor in the output circuit.

Another object of the invention is to provide a circuit which gives current regulation without preventing the saturation of the output transistor.

Another object of the invention is to provide a circuit wherein the output signal may be taken from the emitter of the output circuit in order to provide a low impedance output.

These and other objects and advantages of the invention will become apparent with the reading of the following description in conjunction with the accompanying figure in which the output circuit is shown in detail and the magnetic head and storage medium with the amplifier attached thereto are shown schematically.

Referring now to the figure, a small section of magnetic storage medium is shown schematically by the element 100. This element 100 may, in fact, be a small section of a magnetic tape, or it may comprise a small section of a very large magnetic drum. For that matter, the element 100 may represent any other type of magnetic storage medium such as is known in the art wherein relative motion between the magnetic storage medium and the transducer produces a signal in a coil wound on said transducer. This signal is representative of the information on said storage medium. The transducer is schematically shown by magnetic head 102. The output signal from head 102 is fed via wires 104 (schematically shown as a cable) to the input of amplifier circuit 106. The amplifier may be of any desired type but one preferred embodiment may comprise a plurality of transistors connected in push-pull arrangement in order to provide proper amplification of the input signal applied thereto. For example, the signal produced by magnetic head 102 may be in the neighborhood of 5 millivolts. After operating on this signal, the amplifier may produce an output signal of approximately 23 volts peak-to-peak and approximately 10 milliamperes peak-to-peak (centered about a 5 milliampere level). The output of amplifier 106 is then applied to a voltage divider comprising resistors 108 and 110. Resistor 108 is connected to the base of transistor 112 via resistor 114. Resistor 114 may in actuality, represent the internal base resistance of the transistor itself. However, in the event that an external resistor is applied in the base circuit, the internal base resistance of the transistor 112 may be thought of as being included with the resistor 114. Resistor 108, in addition to being connected to resistor 114, is also connected to one end of resistor 116 in a common junction with the aforesaid resistor 114. Resistor 116 has its other end coupled to a potential source $-Eb$. The potential source which is attached to the resistor 116 produces a negative potential which may be, for example, about −14 volts. The collector of transistor 112 is also connected to a negative potential source $-Ec$. This negative potential source may apply the same negative potential value which is coupled to resistor 116. However, this is not absolutely necessary. For example, $-Ec$ may be actually different from potential source $-Eb$. In this respect, potential source $-Ec$ may provide a potential level of −11 volts. In a preferred embodiment, $-Eb$ is more negative than $-Ec$ in order to provide sufficient base current to assure sharp negative clipping.

The resistor 110 previously described is coupled to the anode of diode 118. The cathode of diode 118 is then connected to the emitter electrode of transistor 112. In addition, the emitter electrode of transistor 112 is coupled to the load 120 which may actually comprise any one of a number of different load networks. For example, in one embodiment of the invention the load actually comprises a Schmitt trigger circuit. The load circuit 120 is then returned to a potential source +EL which provides, for example, a potential level of +28 volts. In an alternative embodiment, the source +EL may be as low as ground potential; however, a positive potential source is preferred.

The operation of the circuit is as follows. The magnetic element 100 has stored thereon magnetic information spots. This type of magnetic storage is well known. As the storage medium 100 moves relative to the magnetic head 102, a signal is produced in the coil of head 102. The signal produced in the coil of head 102, is normally substantially sinusoidal in configuration. That is, as is well known, when the leading edge of an indicia on the magnetic medium 100 passes the gap in the magnetic head 102, a current is generated in the coil on the head due to the change in flux through the magnetic material 102. Similarly, when the trailing edge of the indicia passes under the air gap in the magnetic head 102, another current signal is produced in the coil on the head. Since the signals are produced by the changing flux in the head, and since the changing flux in the magnetic head is changing in opposite directions at the two edges of the indicia, the signal produced in the coil on the head is, therefore, approximately sinusoidal in configuration. The signal produced in the coil is then transferred to amplifier 106 via wires 104.

As previously noted, the amplifier may be any one of the well known types. For example, this amplifier may use direct coupled push-pull circuit design which includes both D.C. and A.C. feedback paths for stabilization and variation of the gain setting respectively. The direct coupling may be used in order to provide the best low frequency response. Good response is required at the low end of the pass band because in a return-to-zero recording system some of the channels on the tape or other magnetic storage medium can remain idle for appreciable lengths of time. In particular, the amplifier may consist of a three stage push-pull circuit which uses transistors which provide a gain of about 80 in each stage. This type of amplification may be obtained by using Raytheon type 2N428 transistors throughout. These transistors may be used since they have a beta characteristic greater than 60. It may be seen that the overall open loop current gain of the amplifier is therefore approximately 125,000 which is more than sufficient for supplying the highest required closed loop gain of 3200 which is required for certain types of plastic tapes. Moreover, the push-pull circuits are used to obtain a minimum amount of delay through the network and also to permit a simpler method for stabilizing the output. Of course, this is only an exemplary type of amplifier and others may be known to those skilled in the art. Moreover, it should be noted that the current signal produced by the amplifier when the magnetic head 102 reads a binary zero, which is signified by a lack of magnetic indicia on the storage medium, has a signal level which is greater than zero.

The signal from the amplifier is now applied to the output circuit. In particular, a signal is applied to the junction of resistors 108 and 110. If, at present, diode 118 is ignored, it will be seen that the current flow and the operation of transistor 112 are, in some measure at least, controlled by the amplitude of the signal applied by amplifier 106. That is, if the signal applied by amplifier 106 is a positive-going signal, for example, then the transistor 112 will be seen to be either turned on if initially it was OFF or, in the alternative, it will be maintained in the ON condition if the transistor was initially in the ON condition. This may be seen by noting that resistor 108 may have an exemplary value of 820 ohms while resistor 110 may be on the order of 470 ohms. Thus, in view of the fact that potential source $-Eb$ has a magnitude of approximately $-14$ volts and in view of the fact that resistor 116 has a magnitude of approximately 10,000 ohms, it may be seen that the emitter electrode of transistor 112 will have a relatively positive potential applied thereto when compared to the base electrode of the transistor. Consequently, transistor 112 will either be turned ON or maintained ON. In the usual mode of operation the transistor 112 will actually be maintained in the ON condition. Thus, so long as transistor 112 is maintained in the ON condition, the current flowing through the load 120 will be passed by transistor 112 whereby the amplification characteristic of the transistor 112 may be utilized. This condition inserts an amplification factor of approximately 80 into the amount of current which is applied to the load 120. This may be shown by the usual transistor circuit mathematics wherein collector current is designated as the base current, $I_b$, times the amplification factor beta. More particularly, the equation which determines the amount of emitter current is as follows: $I_e = I_b(\beta+1)$. Clearly, the advantage of having the transistor conducting may be easily seen insofar as the current is amplified by the beta figure, which amplification is not provided in the event that the transistor is cut off.

Still ignoring the diode 118, it will be assumed that the signal applied to the output circuit by the amplifier 106 is a negative going signal. This negative going signal may produce a potential of approximately $-11$ volts. It may be seen that with the application of this negative going signal to the emitter electrode of transistor 112, the transistor may be biased into the cut off region. When the transistor is cut off, the current supplied to load 120 via the emitter electrode of transistor 112 is also cut off. Therefore, the only current supplied to the load would be from potential source $-Eb$, via resistors 116, 110 and 108. In addition, the introduction of a large resistor 116 into the circuit which supplies the current to the load 120 may, in fact, severely reduce the amount of current supplied to the load 120. Moreover, since the current is also not passed by the transistor 112, the amplification factor $\beta$ is not applied to the current which is supplied to the load. Therefore, the amplification factor of 60–80 times the current supplied to the load is eliminated. It may be seen that with the reduction of current by a factor of 60–80, the load 120 attempts to draw a substantially constant current through the base resistor circuit. The current flowing through resistors 116, 108 and 110 will provide a very serious power dissipation problem. In addition, power source $-Eb$ may not be able to provide such a current drain.

Therefore, diode 118 is placed in the emitter electrode circuit as shown. Once again, it may be seen that with the application of a positive going signal by the amplifier 106, the diode 118 as is poled, will not interfere with the operation of the transistor. That is, since the signal applied by amplifier 106 is positive going, this signal will pass through diode 118 as before and will either maintain transistor 112 in the ON condition or cause the transistor to obtain this condition. This, of course, assumes that the forward impedance of the diode 118 is a very low impedance as is the usual case.

However, in the alternative, it may be seen that when amplifier 106 provides a negative going signal, the diode 118 becomes back-biased. That is, since load 120 is returned to source $+EL$, the cathode of diode 118 is clearly very positive relative to the anode of said diode. Therefore, diode 118 will be rendered non-conducting and considered an infinite impedance within the emitter electrode circuit. Therefore, the only circuit through which current may be applied to load 120, includes resistors 108, 116, 114 and the emitter electrode of the transistor 112. Transistor 112 is still maintained in the ON condition even with the application of the negative going pulse by amplifier 106. This is true insofar as source $+EL$ applies a positive potential at the emitter while the potential applied at the base electrode of the transistor 112 is a negative potential. The current applied to load 120 must again pass through transistor 112. Since this current is passed by transistor 112, the amplification factor $\beta$ is applied to the current so supplied.

It may be seen that the insertion of the diode 118 into the emitter electrode circuit between the amplifier 106 and load 120 effectively provides a blocking diode, which prevents the driving of transistor 112 to cut off whereby the amplification characteristics of the transistor would be eliminated. In addition, the insertion of diode 118 regulates the amount of current which is drawn from the base of the transistor 112, and assures the fact that load 120 will receive the necessary amount of current. Moreover, the diode 118 does not interfere with the driving of the transistor 112 to saturation. Clearly it may be seen that by driving the transistor 112 to saturation, a current gain advantage may be obtained. For example, a greater current output may be produced by transistor 112. It may be seen that many purposes and advantages may be provided for by inserting diode 118 into the emitter electrode circuit of transistor 112 between the input signal amplifier 106 and the load 120.

Having thus described the invention what is claimed is:

1. A current regulating circuit comprising an emitter follower transistor circuit, a plurality of potential sources connected to the electrodes of said transistor, an input source, said input source providing a signal having positive and negative going portions, an output load, said transistor providing current flow to said output load in response to said positive going portion of said input signal, and a blocking diode coupled between said input source and said output load to prevent current flow from said load to said input source during a negative going portion of the signal provided thereby, said potential sources being so related that said transistor provides current flow to said output load during said negative going portion of said input signal while said blocking diode prevents current flow from said load to said input source, said transistor providing different current for the different portions of said input signal.

2. The combination of, output load means, semiconductor means having emitter, base and collector electrodes, said semiconductor means having the emitter electrode thereof coupled to said output load means, source means coupled to different electrodes of said means thereby to produce a predetermined minimum current from said semiconductor, input means for supplying a variable sense signal to said emitter electrode of said semiconductor means, and unilateral conducting means coupled between said input means and said emitter electrode of said semiconductor means for selectively passing portions of said variable signal whereby the current produced by said semiconductor and supplied to said output device remains at or above a substantially constant magnitude regardless of the sense of the signal applied by said input means.

3. A current regulating device comprising an emitter follower transistor circuit, a plurality of different potential sources, each of said different sources connected to a different one of the electrodes of said transistor, an input signal supplying source connected to the emitter electrode of said transistor for supplying input signals thereto, said input signal having positive and negative going portions, an output load connected to the emitter electrode of said transistor, said transistor providing current flow to said output load in response to said positive going portion of said input signals, and a blocking diode coupled between said input source and said output load to prevent current flow from said load to said input signal source during a negative going portion of an input signal, said potential sources being so related that said transistor provides current flow to said load during said negative going portion of said input signal while said blocking diode prevents current flow from said load to said input source, said transistor providing different current for the different portions of said input signal.

4. A current regulator comprising an input source for supplying an alternating signal which approximates a sinusoidal waveform and has high and low levels, a transistor having emitter, collector and base electrodes, a rectifier diode having anode and cathode electrodes, said diode cathode being connected to said transistor emitter, first resistor means connected between said input source and said diode anode, second resistor means connected between said input means and said transistor base, said first and second resistor means comprising a voltage divider network such that said transistor is biased on by the high level of said alternating signal, first reference potential means, third resistor means connected between said first reference potential means and said transistor base, second reference potential means connected directly to said transistor collector, said first and second potential means providing a means for continuing said transistor in the on condition when said rectifier diode is reverse biased by the low level of said alternating signal, and output means connected to said transistor emitter and said diode cathode for receiving current from said transistor when it is in the on condition.

5. The combination recited in claim 4 wherein a further resistor means is connected between said transistor base and said second and said third resistor means.

6. A current regulator comprising an input source for supplying an alternating signal which approximates a sinusoidal waveform having positive and negative signal portions, a transistor having emitter, collector and base electrodes, a rectifier diode having anode and cathode electrodes, said diode cathode being connected to said transistor emitter, first resistor means connected between said input means and said diode anode, second resistor means connected between said input means and said transistor base electrode, said diode being reverse biased by said negative signal portion and forward biased by said positive signal portion, said first and second resistor means comprising a voltage divider network such that said transistor is biased on to produce a first current by the positive portion of said alternating signal when said diode is forward biased, first reference potential means, third resistor means connected between said first reference potential means and said transistor base electrode, second reference potential means connected directly to said transistor collector electrode, said reference potential providing potentials of such relative value that said transistor is biased on to produce a second current when said diode is reverse biased by said negative signal portion, and output means connected to said transistor emitter electrode and said diode cathode for receiving the current flow produced by said transistor.

References Cited by the Examiner

UNITED STATES PATENTS 2,961,551 11/60 Mattson ............. 307—88.5

FOREIGN PATENTS 802,307 10/58 Great Britain.

LLOYD McCOLLUM, *Primary Examiner.*

MILTON O. HIRSHFIELD, *Examiner.*